United States Patent
Kuo et al.

(10) Patent No.: US 12,002,197 B2
(45) Date of Patent: Jun. 4, 2024

(54) ERROR REDUCTION IN RECONSTRUCTED IMAGES IN DEFECT DETECTION METHOD, ELECTRONIC DEVICE AND STORAGE MEDIUM

(71) Applicant: HON HAI PRECISION INDUSTRY CO., LTD., New Taipei (TW)

(72) Inventors: Chin-Pin Kuo, New Taipei (TW); Tung-Tso Tsai, New Taipei (TW); Shih-Chao Chien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 436 days.

(21) Appl. No.: 17/526,314

(22) Filed: Nov. 15, 2021

(65) Prior Publication Data

US 2022/0198633 A1    Jun. 23, 2022

(30) Foreign Application Priority Data

Dec. 22, 2020  (CN) .......................... 202011524958.2

(51) Int. Cl.
  *G06T 7/00*    (2017.01)
  *G06T 1/00*    (2006.01)
  *G06T 5/50*    (2006.01)

(52) U.S. Cl.
  CPC ............ *G06T 7/001* (2013.01); *G06T 1/0007* (2013.01); *G06T 5/50* (2013.01); *G06T 2207/30148* (2013.01)

(58) Field of Classification Search
  CPC ......... G06T 7/001; G06T 1/0007; G06T 5/50; G06T 2207/30148; G06T 2207/20076; G06T 7/0004; G06T 2207/10004; G06T 2207/20081; G06T 2207/20084; G06T 2207/30108; G06N 3/045; G06N 3/08; G06N 3/047; G06N 7/01
  See application file for complete search history.

(56) References Cited

U.S. PATENT DOCUMENTS

2019/0287230 A1 *  9/2019  Lu ........................... G06N 3/088
2020/0273210 A1 *  8/2020  Nguyen ................ G06F 30/398

FOREIGN PATENT DOCUMENTS

CN            102706881          10/2012

* cited by examiner

*Primary Examiner* — Hwa Andrew Lee
(74) *Attorney, Agent, or Firm* — ScienBiziP, P.C.

(57) ABSTRACT

A defect detection method based on an image of products and an electronic device can accurately determine the error threshold by determining the reconstruction error generated during image reconstruction and by determining the estimated probability generated by the Gaussian mixture model. The test error can then be compared with the error, since the test error and the error threshold are compared numerically, the existence of subtle defects are revealed in the product image, thereby improving the accuracy of defect detection.

20 Claims, 2 Drawing Sheets

ERROR REDUCTION IN RECONSTRUCTED IMAGES IN DEFECT DETECTION METHOD, ELECTRONIC DEVICE AND STORAGE MEDIUM

FIELD

The present disclosure relates to a technical field of quality control in manufacturing, specifically a defect detection method, an electronic device and a storage medium based on a product image.

BACKGROUND

In order to improve qualities of industrial products, the industrial products should be inspected for defects before they are packaged. As the traditionally defect detection methods are subject to certain errors in the process of reconstructing images of the quality of a product, products with subtle defects may not be detected, thereby reducing the accuracy of defect detection.

DETAILED DESCRIPTION

The accompanying drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Optionally, the defect detection method of the present disclosure can be applied to one or more electronic devices. The electronic device includes hardware such as, but not limited to, a microprocessor and an Application Specific Integrated Circuit (ASIC), Field-Programmable Gate Array (FPGA), Digital Signal Processor (DSP), embedded devices, etc.

The electronic device may be a device such as a desktop computer, a notebook, a palmtop computer, or a cloud server. The electronic device can interact with users through a keyboard, a mouse, a remote control, a touch panel, or a voice control device.

Figure 1:
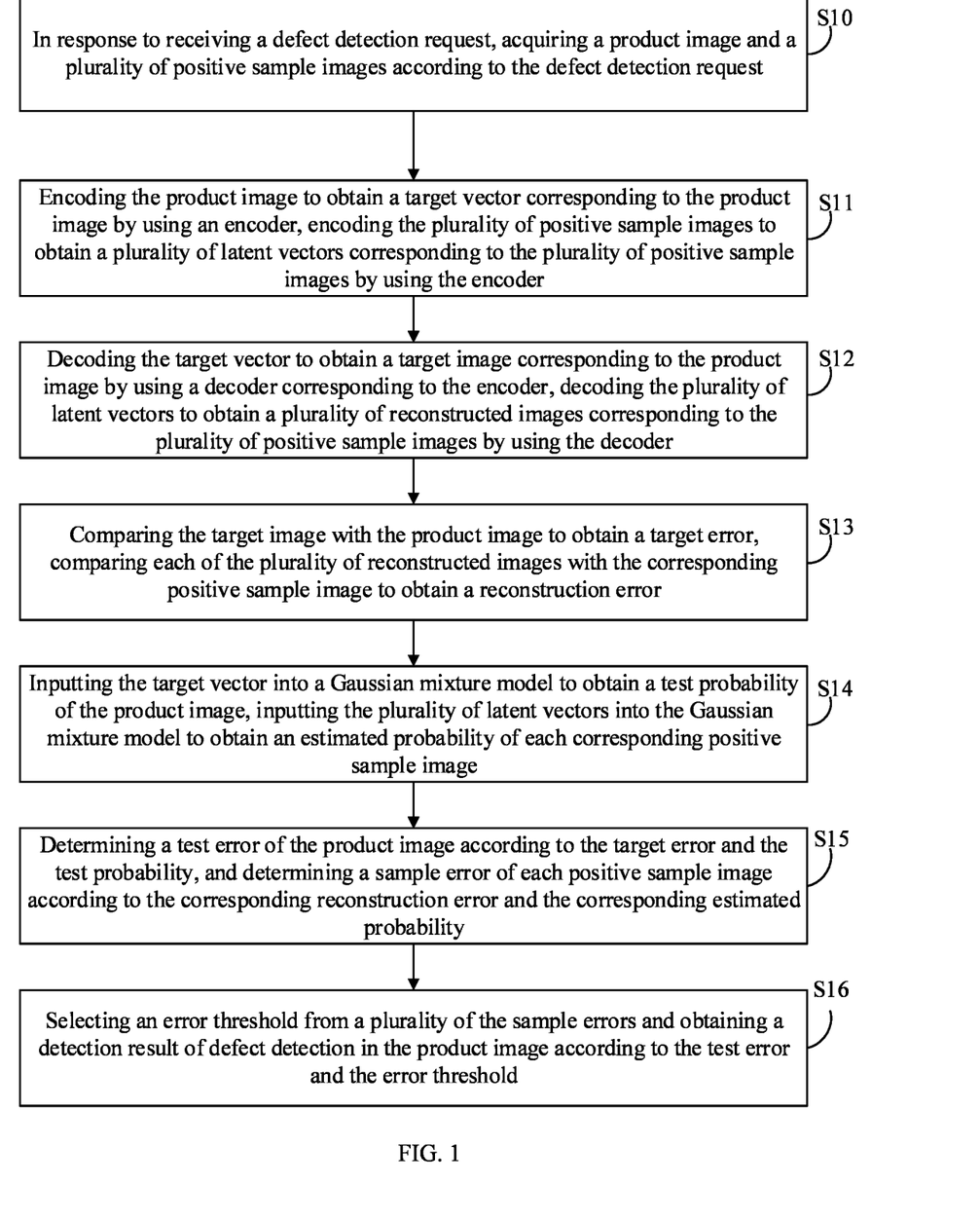
FIG. 1 shows a flowchart of a defect detection method provided in an embodiment of the present disclosure.

FIG. 1 is a flowchart of a defect detection method in an embodiment of the present disclosure. The defect detection method is applied to electronic devices. According to different needs, the order of the steps in the flowchart can be changed, and some can be omitted.

In block S10, in response to receiving a defect detection request, acquiring a product image and a plurality of positive sample images according to the defect detection request.

In at least one embodiment of the present disclosure, the defect detection request can be triggered by a user (for example, triggered by touching a preset function button), or can be triggered automatically within a preset time, which is not limited.

The preset time may be a time point (for example, nine o'clock in the morning every day), or the beginning of a period of time.

In at least one embodiment of the present disclosure, information carried in the defect detection request includes, but is not limited to: a detection object (a product as an object, or images of the product, or both) and the like.

In at least one embodiment of the present disclosure, the method of acquiring an product image and a plurality of positive sample images according to the defect detection request includes: parsing the defect detection request to obtain data information carried in the defect detection request; acquiring a preset label and obtaining information corresponding to the preset label from the data information as being a detection object; acquiring an product image from a product library according to the detection object, and acquiring a plurality of relevant positive sample images from a sample library.

The preset label refers to a pre-defined label, for example, the preset label may be a name.

The product library stores a plurality of images of products which may not reveal defects in the product, and the sample library stores a plurality of images of sample products which are non-defects (hereinafter "positive sample images").

By parsing the defect detection request, the time of parsing the defect detection request can be shortened, thereby improving the parsing efficiency. A mapping relationship between the preset label and the detection object enables the detection object to be accurately determined, so that the product image and the plurality of positive sample images can be accurately acquired.

In block S11, encoding the product image to obtain a target vector corresponding to the product image by using an encoder, encoding the plurality of positive sample images to obtain a plurality of latent vectors corresponding to the plurality of positive sample images by using the encoder.

In at least one embodiment of the present disclosure, the encoder may be an encoder in an autoencoder. The encoder includes a plurality of hidden layers (that is, non-visible layers), and a number of hidden layers can be arbitrarily set.

In at least one embodiment of the present disclosure, the method of encoding the product image to obtain a target vector corresponding to the product image by using an encoder includes: performing a vectorization process on the product image to obtain a first feature vector; acquiring a first hidden layer in the encoder and calculating the first feature vector through the acquired first hidden layer to obtain the target vector.

In at least one embodiment of the present disclosure, the method of calculating the first feature vector through the acquired first hidden layer to obtain the target vector includes: acquiring a first weighting matrix and a first offset value of the acquired first hidden layer; multiplying the first feature vector and the first weighting matrix to obtain a first operation result and adding the first operation result and the first offset value to obtain the target vector.

In other embodiments, the progress of using the encoder to encode the product image to obtain the target vector is the same as the process of using the encoder to encode the plurality of positive sample images to obtain a plurality of latent vectors. The method of encoding one positive sample image to obtain one latent vector corresponding to the plurality of positive sample images by using the encoder includes: performing a vectorization process on the positive sample image to obtain a second feature vector; acquiring a second hidden layer in the encoder and calculating the second feature vector through the acquired second hidden layer to obtain the latent vector. In at least one embodiment of the present disclosure, the method of calculating the second feature vector through the acquired second hidden layer to obtain the latent vector includes: acquiring a second weighting matrix and a second offset value of the acquired second hidden layer; multiplying the second feature vector and the second weighting matrix to obtain a second operation result and adding the second operation result and the second offset value to obtain the latent vector.

In block S12, decoding the target vector to obtain a target image corresponding to the product image by using a decoder corresponding to the encoder, decoding the plurality of latent vectors to obtain a plurality of reconstructed images corresponding to the plurality of positive sample images by using the decoder.

In at least one embodiment of the present disclosure, the decoder may be a decoder in the autoencoder. The decoder includes calculation layers which correspond to the hidden layers in the encoder.

In at least one embodiment of the present disclosure, the calculation layers are used to calculate the target vector, and vector obtained after the calculation is restored to obtain the target image.

In other embodiments, the process of obtaining the plurality of reconstructed images is the same as the process of obtaining the target image, which will not be repeated here.

In block S13, comparing the target image with the product image to obtain a target error, comparing each of the plurality of reconstructed images with the corresponding positive sample image to obtain a reconstruction error.

In at least one embodiment of the present disclosure, "target error" refers to an error generated during reconstruction of the product image.

In at least one embodiment of the present disclosure, the method of comparing the target image with the product image to obtain a target error includes: acquiring all pixels of the product image as a plurality of examinable pixels, and acquiring all pixels of the target image as a plurality of target pixels; comparing each target pixel with the corresponding examinable pixel and when a comparison result is that a target pixel is different from the corresponding examinable pixel, calculating a number of differences between the target pixel and the corresponding examinable pixel (hereinafter "first number"), and calculating a total number of the plurality of target pixels (hereinafter "second number"); dividing the first number by the second number to obtain the target error.

Through the above embodiments, the target error can be accurately determined.

In other embodiments, the process of determining the reconstruction error corresponding each positive sample image is the same as the process of determining the target error corresponding the product image, which will not be repeated here.

In block S14, inputting the target vector into a Gaussian mixture model to obtain a test probability of the product image, inputting the plurality of latent vectors into the Gaussian mixture model to obtain an estimated probability of each corresponding positive sample image.

In at least one embodiment of the present disclosure, the Gaussian mixture model refers to an open source mixture model, and the Gaussian mixture model includes a plurality of single Gaussian models.

In at least one embodiment of the present disclosure, the method of inputting the target vector into a Gaussian mixture model to obtain a test probability of the product image and inputting the plurality of latent vectors into the Gaussian mixture model to obtain an estimated probability of each corresponding positive sample image includes: inputting the plurality of latent vectors into the Gaussian mixture model to obtain a feature distribution of the plurality of positive sample images; determining an average value and a covariance of the plurality of latent vectors according to the feature distribution, and acquiring a mixing coefficient of the Gaussian mixture model; determining a test probability of the product image according to the target vector, the average value, the covariance and the mixing coefficient, and determining the test probability of each positive sample image according to each latent vector, the average value, and the covariance and the mixing coefficient.

Through the above embodiments, the test probability and the estimated probability can be accurately determined.

In block S15, determining a test error of the product image according to the target error and the test probability, and determining a sample error of each positive sample image according to the corresponding reconstruction error and the corresponding estimated probability.

In at least one embodiment of the present disclosure, the method of determining a sample error of each positive sample image according to the corresponding reconstruction error and the corresponding estimated probability includes: calculating a logarithmic value of each estimated probability; calculating a weighted sum of an opposite value of the logarithmic value and the corresponding reconstruction error to obtain the sample error of the corresponding positive sample image.

For example, assuming that the estimated probability is 0.01, and the reconstruction error is 0.03, a logarithmic value of the estimated probability 0.01 is log(0.01)=−2. An opposite value of the logarithmic value "−2" is 2. For calculating a weighted sum of the opposite value2 and the reconstruction error 0.03, the weighted sum is 2.03. When a ratio between the estimated probability and the sample error is 20%, and a ratio between the reconstruction error and the sample error is 80%, the calculated sample error is: 2*20%+0.03*80%=0.424.

Through the above embodiments, the test error generated during the reconstruction process of the product image and the sample error generated during the reconstruction process of the positive sample image can be determined.

In block S16, selecting an error threshold from a plurality of the sample errors and obtaining a detection result of defect detection in the product image according to the test error and the error threshold.

In at least one embodiment of the present disclosure, the detection result is that the product image reveals one or more defects or that no defects are revealed in the product image.

In at least one embodiment of the present disclosure, the method of selecting an error threshold from a plurality of the sample errors includes: sorting the sample errors in ascending order to obtain a list of errors and a sequence number of each sample error in the list of errors; calculating a number of the sample errors (hereinafter "third number"), and multiplying the third number by a configuration value to obtain a target value; selecting a sample error which has sequence number equal to the target value from the error list and determining the sequence number of the selected sample error as the error threshold.

Through the above embodiments, it is possible to determine errors that affect the images during the reconstruction process and the probability distribution.

In at least one embodiment of the present disclosure, the method of obtaining a detection result of defect detection in the product image according to the test error and the error threshold includes: determining that a detection result is that there are one or more defects in the product image when the test error is less than the error threshold and determining that a detection result is that there are no defects in the product image when the test error is greater than or equal to the error threshold.

By comparing the test error with the error threshold, a numerical comparison between the test error and the error threshold is realized. Therefore, detection of subtle defects in the image of the product can be achieved, improving an accuracy of defect detection.

In at least one embodiment of the present disclosure, when a defect is revealed in the product image, a warning or indication is generated, and the product image is sent to terminal devices of a designated contact or department.

The designated contact or department can include a person responsible for detecting quality of a product and taking action accordingly product image.

Through the above embodiment, when a defect product image is detected, the designated contact person can be notified in a timely manner.

The present disclosure can accurately determine the error threshold by determining the reconstruction error generated during image reconstruction and by determining the estimated probability generated by the Gaussian mixture model. The test error can then be compared with the error, since the test error and the error threshold are compared numerically, the existence of subtle defects are revealed in the product image, thereby improving the accuracy of defect detection.

Figure 2:
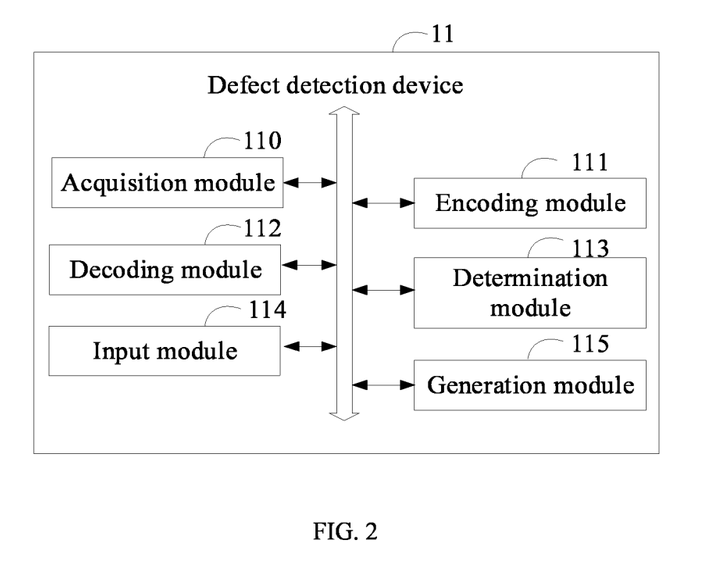
FIG. 2 shows a schematic structural diagram of a defect detection device provided in an embodiment of the present disclosure.

FIG. 2 shows a defect detection device provided in the embodiment of the present disclosure.

In some embodiments, the defect detection device 11 runs in an electronic device. The defect detection device 11 can include a plurality of function modules consisting of program code segments. The program code of each program code segments in the defect detection device 11 can be stored in a memory and executed by at least one processor to perform image processing (described in detail in FIG. 2).

As shown in FIG. 2, the defect detection device 11 can include: an acquisition module 110, an encoding module 111, a decoding module 112, a determination module 113, an input module 114, and a generation module 115. A module as referred to in the present disclosure refers to a series of computer-readable instruction segments that can be executed by at least one processor and that are capable of performing fixed functions, which are stored in a memory. In some embodiment, the functions of each module will be detailed.

The above-mentioned integrated unit implemented in a form of software functional modules can be stored in a non-transitory readable storage medium. The above software function modules are stored in a storage medium and includes several instructions for causing an electronic device (which can be a personal computer, a dual-screen device, or a network device) or a processor to execute the method described in various embodiments in the present disclosure.

In response to receiving a defect detection request, the acquisition module 110 acquires a product image and a plurality of positive sample images according to the defect detection request.

In at least one embodiment of the present disclosure, the defect detection request can be triggered by a user (for example, triggered by touching a preset function button), or can be triggered automatically within a preset time, which is not limited.

The preset time may be a time point (for example, nine o'clock in the morning every day), or the beginning of a period of time.

In at least one embodiment of the present disclosure, information carried in the defect detection request includes, but is not limited to: a detection object (a product as an object, or images of the product, or both) and the like.

In at least one embodiment of the present disclosure, the acquisition module 110 acquiring an product image and a plurality of positive sample images according to the defect detection request includes: parsing the defect detection request to obtain data information carried in the defect detection request; acquiring a preset label and obtaining information corresponding to the preset label from the data information as being a detection object; acquiring an product image from a product library according to the detection object, and acquiring a plurality of relevant positive sample images from a sample library.

The preset label refers to a pre-defined label, for example, the preset label may be a name.

The product library stores a plurality of images of products which may not reveal defects in the product, and the sample library stores a plurality of images of sample products which are non-defects (hereinafter "positive sample images").

By parsing the defect detection request, the time of parsing the defect detection request can be shortened, thereby improving the parsing efficiency. A mapping relationship between the preset label and the detection object enables the detection object to be accurately determined, so that the product image and the plurality of positive sample images can be accurately acquired.

The encoding module 111 encodes the product image to obtain a target vector corresponding to the product image by using an encoder, encodes the plurality of positive sample images to obtain a plurality of latent vectors corresponding to the plurality of positive sample images by using the encoder.

In at least one embodiment of the present disclosure, the encoder may be an encoder in an autoencoder. The encoder includes a plurality of hidden layers (that is, non-visible layers), and a number of hidden layers can be arbitrarily set.

In at least one embodiment of the present disclosure, the encoding module 111 encoding the product image to obtain a target vector corresponding to the product image by using an encoder includes: performing a vectorization process on the product image to obtain a first feature vector; acquiring a first hidden layer in the encoder and calculating the first feature vector through the acquired first hidden layer to obtain the target vector.

In at least one embodiment of the present disclosure, the encoding module 111 calculating the first feature vector through the acquired first hidden layer to obtain the target vector includes: acquiring a first weighting matrix and a first offset value of the acquired first hidden layer; multiplying the first feature vector and the first weighting matrix to obtain a first operation result and adding the first operation result and the first offset value to obtain the target vector.

In other embodiments, the progress of using the encoder to encode the product image to obtain the target vector is the same as the process of using the encoder to encode the plurality of positive sample images to obtain a plurality of latent vectors. The encoding module 111 encoding one positive sample image to obtain one latent vector corresponding to the plurality of positive sample images by using the encoder includes: performing a vectorization process on the positive sample image to obtain a second feature vector; acquiring a second hidden layer in the encoder and calculating the second feature vector through the acquired second hidden layer to obtain the latent vector. In at least one embodiment of the present disclosure, the encoding module 111 calculating the second feature vector through the acquired second hidden layer to obtain the latent vector includes: acquiring a second weighting matrix and a second offset value of the acquired second hidden layer; multiplying the second feature vector and the second weighting matrix to obtain a second operation result and adding the second operation result and the second offset value to obtain the latent vector.

The decoding module 112 decodes the target vector to obtain a target image corresponding to the product image by using a decoder corresponding to the encoder, decoding the plurality of latent vectors to obtain a plurality of reconstructed images corresponding to the plurality of positive sample images by using the decoder.

In at least one embodiment of the present disclosure, the decoder may be a decoder in the autoencoder. The decoder includes calculation layers which correspond to the hidden layers in the encoder.

In at least one embodiment of the present disclosure, the calculation layers are used to calculate the target vector, and vector obtained after the calculation is restored to obtain the target image.

In other embodiments, the process of obtaining the plurality of reconstructed images is the same as the process of obtaining the target image, which will not be repeated here.

The determination module 113 compares the target image with the product image to obtain a target error, compares each of the plurality of reconstructed images with the corresponding positive sample image to obtain a reconstruction error.

In at least one embodiment of the present disclosure, "target error" refers to an error generated during reconstruction of the product image.

In at least one embodiment of the present disclosure, the determination module 113 comparing the target image with the product image to obtain a target error includes: acquiring all pixels of the product image as a plurality of examinable pixels, and acquiring all pixels of the target image as a plurality of target pixels; comparing each target pixel with the corresponding examinable pixel and when a comparison result is that a target pixel is different from the corresponding examinable pixel, calculating a number of differences between the target pixel and the corresponding examinable pixel (hereinafter "first number"), and calculating a total number of the plurality of target pixels (hereinafter "second number"); dividing the first number by the second number to obtain the target error.

Through the above embodiments, the target error can be accurately determined.

In other embodiments, the process of determining the reconstruction error corresponding each positive sample image is the same as the process of determining the target error corresponding the product image, which will not be repeated here.

The input module 114 inputs the target vector into a Gaussian mixture model to obtain a test probability of the product image, inputs the plurality of latent vectors into the Gaussian mixture model to obtain an estimated probability of each corresponding positive sample image.

In at least one embodiment of the present disclosure, the Gaussian mixture model refers to an open source mixture model, and the Gaussian mixture model includes a plurality of single Gaussian models.

In at least one embodiment of the present disclosure, the input module 114 of inputting the target vector into a Gaussian mixture model to obtain a test probability of the product image and inputting the plurality of latent vectors into the Gaussian mixture model to obtain an estimated probability of each corresponding positive sample image includes: inputting the plurality of latent vectors into the Gaussian mixture model to obtain a feature distribution of the plurality of positive sample images; determining an average value and a covariance of the plurality of latent vectors according to the feature distribution, and acquiring a mixing coefficient of the Gaussian mixture model; determining a test probability of the product image according to the target vector, the average value, the covariance and the mixing coefficient, and determining the test probability of each positive sample image according to each latent vector, the average value, and the covariance and the mixing coefficient.

Through the above embodiments, the test probability and the estimated probability can be accurately determined.

The determination module 113 determines a test error of the product image according to the target error and the test probability, and determines a sample error of each positive sample image according to the corresponding reconstruction error and the corresponding estimated probability.

In at least one embodiment of the present disclosure, the determination module 113 determining a sample error of each positive sample image according to the corresponding reconstruction error and the corresponding estimated probability includes: calculating a logarithmic value of each estimated probability; calculating a weighted sum of an opposite value of the logarithmic value and the corresponding reconstruction error to obtain the sample error of the corresponding positive sample image.

For example, assuming that the estimated probability is 0.01, and the reconstruction error is 0.03, a logarithmic value of the estimated probability 0.01 is log(0.01)=−2. An opposite value of the logarithmic value "−2" is 2. For calculating a weighted sum of the opposite value2 and the reconstruction error 0.03, the weighted sum is 2.03. When a ratio between the estimated probability and the sample error is 20%, and a ratio between the reconstruction error and the sample error is 80%, the calculated sample error is: 2*20%+0.03*80%=0.424.

Through the above embodiments, the test error generated during the reconstruction process of the product image and the sample error generated during the reconstruction process of the positive sample image can be determined.

The determination module 113 selects an error threshold from a plurality of the sample errors and obtaining a detection result of defect detection in the product image according to the test error and the error threshold.

In at least one embodiment of the present disclosure, the detection result is that the product image reveals one or more defects or that no defects are revealed in the product image.

In at least one embodiment of the present disclosure, the determination module 113 selecting an error threshold from a plurality of the sample errors includes: sorting the sample errors in ascending order to obtain a list of errors and a sequence number of each sample error in the list of errors; calculating a number of the sample errors (hereinafter "third number"), and multiplying the third number by a configuration value to obtain a target value; selecting a sample error which has sequence number equal to the target value from the error list and determining the sequence number of the selected sample error as the error threshold.

Through the above embodiments, it is possible to determine errors that affect the images during the reconstruction process and the probability distribution.

In at least one embodiment of the present disclosure, the determination module 113 obtaining a detection result of defect detection in the product image according to the test error and the error threshold includes: determining that a detection result is that there are one or more defects in the product image when the test error is less than the error threshold and determining that a detection result is that there are no defects in the product image when the test error is greater than or equal to the error threshold.

By comparing the test error with the error threshold, a numerical comparison between the test error and the error threshold is realized. Therefore, detection of subtle defects in the image of the product can be achieved, improving an accuracy of defect detection.

In at least one embodiment of the present disclosure, when a defect is revealed in the product image, the generation module 115 generates a warning or indication and sends the product image to terminal devices of a designated contact or department.

The designated contact or department can include a person responsible for detecting quality of a product and taking action accordingly product image.

Through the above embodiment, when a defect product image is detected, the designated contact person can be notified in a timely manner.

The present disclosure can accurately determine the error threshold by determining the reconstruction error generated during image reconstruction and by determining the estimated probability generated by the Gaussian mixture model. The test error can then be compared with the error, since the test error and the error threshold are compared numerically, the existence of subtle defects are revealed in the product image, thereby improving the accuracy of defect detection.

The embodiment also provides a non-transitory readable storage medium having computer-readable instructions stored therein. The computer-readable instructions are executed by a processor to implement the steps in the above-mentioned defect detection method, such as in steps in blocks S10-S16 shown in FIG. 1:

In block S10, in response to receiving a defect detection request, acquiring a product image and a plurality of positive sample images according to the defect detection request;

In block S11, encoding the product image to obtain a target vector corresponding to the product image by using an encoder, encoding the plurality of positive sample images to obtain a plurality of latent vectors corresponding to the plurality of positive sample images by using the encoder;

In block S12, decoding the target vector to obtain a target image corresponding to the product image by using a decoder corresponding to the encoder, decoding the plurality of latent vectors to obtain a plurality of reconstructed images corresponding to the plurality of positive sample images by using the decoder;

In block S13, comparing the target image with the product image to obtain a target error, comparing each of the plurality of reconstructed images with the corresponding positive sample image to obtain a reconstruction error;

In block S14, inputting the target vector into a Gaussian mixture model to obtain a test probability of the product image, inputting the plurality of latent vectors into the Gaussian mixture model to obtain an estimated probability of each corresponding positive sample image;

In block S15, determining a test error of the product image according to the target error and the test probability, and determining a sample error of each positive sample image according to the corresponding reconstruction error and the corresponding estimated probability;

In block S16, selecting an error threshold from a plurality of the sample errors and obtaining a detection result of defect detection in the product image according to the test error and the error threshold.

The computer-readable instructions are executed by the processor to realize the functions of each module/unit in the above-mentioned device embodiments, such as the modules 110-115 in FIG. 2:

The acquisition module 110, in response to receiving a defect detection request, acquires a product image and a plurality of positive sample images according to the defect detection request;

The encoding module 111 encodes the product image to obtain a target vector corresponding to the product image by using an encoder, encodes the plurality of positive sample images to obtain a plurality of latent vectors corresponding to the plurality of positive sample images by using the encoder;

The decoding module 112 decodes the target vector to obtain a target image corresponding to the product image by using a decoder corresponding to the encoder, decoding the plurality of latent vectors to obtain a plurality of reconstructed images corresponding to the plurality of positive sample images by using the decoder;

The determination module 113 compares the target image with the product image to obtain a target error, compares each of the plurality of reconstructed images with the corresponding positive sample image to obtain a reconstruction error;

The input module 114 inputs the target vector into a Gaussian mixture model to obtain a test probability of the product image, inputs the plurality of latent vectors into the Gaussian mixture model to obtain an estimated probability of each corresponding positive sample image;

The generation module 115, when a defect is revealed in the product image, generates a warning or indication, and sends the product image to terminal devices of a designated contact or department.

Figure 3:
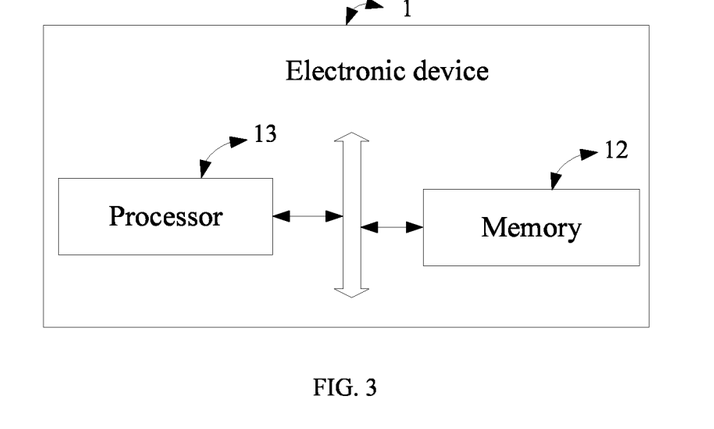
FIG. 3 shows a schematic structural diagram of an electronic device applying the defect detection device in an embodiment of the present disclosure.

FIG. 3 is a schematic structural diagram of an electronic device provided in an embodiment of the present disclosure. The electronic device 1 may include: a memory 12, at least one processor 13, and computer-readable instructions stored in the memory 12 and executable on the at least one processor 13, for example, image recognition programs. The processor 13 executes the computer-readable instructions to implement the steps in the embodiment of the defect detection method, such as in steps in block S10-S16 shown in FIG. 1. Alternatively, the processor 13 executes the computer-readable instructions to implement the functions of the modules/units in the foregoing device embodiments, such as the modules 110-115 in FIG. 2.

For example, the computer-readable instructions can be divided into one or more modules/units, and the one or more modules/units are stored in the memory 12 and executed by the at least one processor 13. The one or more modules/units can be a series of computer-readable instruction segments capable of performing specific functions, and the instruction segments are used to describe execution processes of the computer-readable instructions in the electronic device 1. For example, the computer-readable instruction can be divided into the acquisition module 110, an encoding module 111, a decoding module 112, a determination module 113, an input module 114, and a generation module 115 as in FIG. 2.

The electronic device 1 can be an electronic device such as a desktop computer, a notebook, a palmtop computer, and a cloud server. Those skilled in the art will understand that the schematic diagram 3 is only an example of the electronic device 1 and does not constitute a limitation on the electronic device 1. Another electronic device 1 may include more or fewer components than shown in the figures or may combine some components or have different components. For example, the electronic device 1 may further include an input/output device, a network access device, a bus, and the like.

The at least one processor 13 can be a central processing unit (CPU), or can be another general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 13 can be a microprocessor or any conventional processor. The processor 13 is a control center of the electronic device 1 and connects various parts of the entire electronic device 1 by using various interfaces and lines.

The memory 12 can be configured to store the computer-readable instructions and/or modules/units. The processor 13 may run or execute the computer-readable instructions and/or modules/units stored in the memory 12 and may call up data stored in the memory 12 to implement various functions of the electronic device 1. The memory 12 mainly includes a storage program area and a storage data area. The storage program area may store an operating system, and an application program required for at least one function (such as a sound playback function, an image playback function, etc.), etc. The storage data area may store data (such as audio data, phone book data, etc.) created according to the use of the electronic device 1. In addition, the memory 12 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

When the modules/units integrated into the electronic device 1 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

In the several embodiments provided in the preset disclosure, the disclosed electronic device and method can be implemented in other ways. For example, the embodiments of the devices described above are merely illustrative. For example, divisions of the units are only logical function divisions, and there can be other manners of division in actual implementation.

In addition, each functional unit in each embodiment of the present disclosure can be integrated into one processing unit, or can be physically present separately in each unit or two or more units can be integrated into one unit. The above modules can be implemented in a form of hardware or in a form of a software functional unit.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A defect detection method, the method comprising:
    in response to receiving a defect detection request, acquiring a product image and a plurality of positive sample images according to the defect detection request;
    encoding the product image to obtain a target vector corresponding to the product image by using an encoder, encoding the plurality of positive sample images to obtain a plurality of latent vectors corresponding to the plurality of positive sample images by using the encoder;
    decoding the target vector to obtain a target image corresponding to the product image by using a decoder corresponding to the encoder, decoding the plurality of latent vectors to obtain a plurality of reconstructed images corresponding to the plurality of positive sample images by using the decoder;
    comparing the target image with the product image to obtain a target error, comparing each of the plurality of reconstructed images with the corresponding positive sample image to obtain a reconstruction error;

inputting the target vector into a Gaussian mixture model to obtain a test probability of the product image, inputting the plurality of latent vectors into the Gaussian mixture model to obtain an estimated probability of each corresponding positive sample image;

determining a test error of the product image according to the target error and the test probability, and determining a sample error of each positive sample image according to the corresponding reconstruction error and the corresponding estimated probability;

selecting an error threshold from a plurality of the sample errors and obtaining a detection result of defect detection in the product image according to the test error and the error threshold.

2. The defect detection method of claim 1, wherein encoding the product image to obtain a target vector corresponding to the product image by using an encoder comprises:

performing a vectorization process on the product image to obtain a feature vector;

acquiring a first hidden layer in the encoder and calculating the feature vector through the acquired first hidden layer to obtain the target vector.

3. The defect detection method of claim 1, wherein comparing the target image with the product image to obtain a target error comprises:

acquiring all pixels of the product image as a plurality of examinable pixels, and acquiring all pixels of the target image as a plurality of target pixels;

comparing each target pixel with the corresponding examinable pixel and when a comparison result is that a target pixel is different from the corresponding examinable pixel;

calculating a number of differences between the target pixel as being a first number and the corresponding examinable pixel;

calculating a total number of the plurality of target pixels as being a second number;

dividing the first number by the second number to obtain the target error.

4. The defect detection method of claim 1, wherein inputting the target vector into a Gaussian mixture model to obtain a test probability of the product image and inputting the plurality of latent vectors into the Gaussian mixture model to obtain an estimated probability of each corresponding positive sample image comprises:

inputting the plurality of latent vectors into the Gaussian mixture model to obtain a feature distribution of the plurality of positive sample images;

determining an average value and a covariance of the plurality of latent vectors according to the feature distribution;

acquiring a mixing coefficient of the Gaussian mixture model;

determining a test probability of the product image according to the target vector, the average value, the covariance and the mixing coefficient;

determining the test probability of each positive sample image according to each latent vector, the average value, and the covariance and the mixing coefficient.

5. The defect detection method of claim 1, wherein determining a sample error of each positive sample image according to the corresponding reconstruction error and the corresponding estimated probability comprises:

calculating a logarithmic value of each estimated probability;

calculating a weighted sum of an opposite value of the logarithmic value and the corresponding reconstruction error to obtain the sample error of the corresponding positive sample image.

6. The defect detection method of claim 1, wherein selecting an error threshold from a plurality of the sample errors comprises:

sorting the sample errors in ascending order to obtain a list of errors and a sequence number of each sample error in the list of errors;

calculating a number of the sample errors as being a third number;

multiplying the third number by a configuration value to obtain a target value;

selecting a sample error which has sequence number equal to the target value from the error list and determining the sequence number of the selected sample error as the error threshold.

7. The defect detection method of claim 1, wherein obtaining a detection result of defect detection in the product image according to the test error and the error threshold comprises:

determining that a detection result is that there are one or more defects in the product image when the test error is less than the error threshold;

determining that a detection result is that there are no defects in the product image when the test error is greater than or equal to the error threshold.

8. An electronic device comprising a memory and a processor, the memory stores at least one computer-readable instruction, which when executed by the processor causes the processor to:

in response to receiving a defect detection request, acquire a product image and a plurality of positive sample images according to the defect detection request;

encode the product image to obtain a target vector corresponding to the product image by using an encoder, encode the plurality of positive sample images to obtain a plurality of latent vectors corresponding to the plurality of positive sample images by using the encoder;

decode the target vector to obtain a target image corresponding to the product image by using a decoder corresponding to the encoder, decode the plurality of latent vectors to obtain a plurality of reconstructed images corresponding to the plurality of positive sample images by using the decoder;

compare the target image with the product image to obtain a target error, compare each of the plurality of reconstructed images with the corresponding positive sample image to obtain a reconstruction error;

input the target vector into a Gaussian mixture model to obtain a test probability of the product image, input the plurality of latent vectors into the Gaussian mixture model to obtain an estimated probability of each corresponding positive sample image;

determine a test error of the product image according to the target error and the test probability, and determine a sample error of each positive sample image according to the corresponding reconstruction error and the corresponding estimated probability;

select an error threshold from a plurality of the sample errors and obtain a detection result of defect detection in the product image according to the test error and the error threshold.

9. The electronic device of claim 8, wherein the processor encodes the product image to obtain a target vector corresponding to the product image by using an encoder by:
performing a vectorization process on the product image to obtain a feature vector;
acquiring a first hidden layer in the encoder and calculating the feature vector through the acquired first hidden layer to obtain the target vector.

10. The electronic device of claim 8, wherein the processor compares the target image with the product image to obtain a target error by:
acquiring all pixels of the product image as a plurality of examinable pixels, and acquiring all pixels of the target image as a plurality of target pixels;
comparing each target pixel with the corresponding examinable pixel and when a comparison result is that a target pixel is different from the corresponding examinable pixel;
calculating a number of differences between the target pixel as being a first number and the corresponding examinable pixel;
calculating a total number of the plurality of target pixels as being a second number;
dividing the first number by the second number to obtain the target error.

11. The electronic device of claim 8, wherein the processor inputs the target vector into a Gaussian mixture model to obtain a test probability of the product image and inputs the plurality of latent vectors into the Gaussian mixture model to obtain an estimated probability of each corresponding positive sample image by:
inputting the plurality of latent vectors into the Gaussian mixture model to obtain a feature distribution of the plurality of positive sample images;
determining an average value and a covariance of the plurality of latent vectors according to the feature distribution;
acquiring a mixing coefficient of the Gaussian mixture model;
determining a test probability of the product image according to the target vector, the average value, the covariance and the mixing coefficient;
determining the test probability of each positive sample image according to each latent vector, the average value, and the covariance and the mixing coefficient.

12. The electronic device of claim 8, wherein the processor determines a sample error of each positive sample image according to the corresponding reconstruction error and the corresponding estimated probability by:
calculating a logarithmic value of each estimated probability;
calculating a weighted sum of an opposite value of the logarithmic value and the corresponding reconstruction error to obtain the sample error of the corresponding positive sample image.

13. The electronic device of claim 8, wherein the processor selects an error threshold from a plurality of the sample errors by:
sorting the sample errors in ascending order to obtain a list of errors and a sequence number of each sample error in the list of errors;
calculating a number of the sample errors as being a third number;
multiplying the third number by a configuration value to obtain a target value;
selecting a sample error which has sequence number equal to the target value from the error list and determining the sequence number of the selected sample error as the error threshold.

14. The electronic device of claim 8, wherein the processor obtains a detection result of defect detection in the product image according to the test error and the error threshold by:
determining that a detection result is that there are one or more defects in the product image when the test error is less than the error threshold;
determining that a detection result is that there are no defects in the product image when the test error is greater than or equal to the error threshold.

15. A non-transitory storage medium having stored thereon at least one computer-readable instructions that, when the at least one computer-readable instructions are executed by a processor to implement a defect detection method, which comprises:
in response to receiving a defect detection request, acquiring a product image and a plurality of positive sample images according to the defect detection request;
encoding the product image to obtain a target vector corresponding to the product image by using an encoder, encoding the plurality of positive sample images to obtain a plurality of latent vectors corresponding to the plurality of positive sample images by using the encoder;
decoding the target vector to obtain a target image corresponding to the product image by using a decoder corresponding to the encoder, decoding the plurality of latent vectors to obtain a plurality of reconstructed images corresponding to the plurality of positive sample images by using the decoder;
comparing the target image with the product image to obtain a target error, comparing each of the plurality of reconstructed images with the corresponding positive sample image to obtain a reconstruction error;
inputting the target vector into a Gaussian mixture model to obtain a test probability of the product image, inputting the plurality of latent vectors into the Gaussian mixture model to obtain an estimated probability of each corresponding positive sample image;
determining a test error of the product image according to the target error and the test probability, and determining a sample error of each positive sample image according to the corresponding reconstruction error and the corresponding estimated probability;
selecting an error threshold from a plurality of the sample errors and obtaining a detection result of defect detection in the product image according to the test error and the error threshold.

16. The non-transitory storage medium of claim 15, wherein encoding the product image to obtain a target vector corresponding to the product image by using an encoder comprises:
performing a vectorization process on the product image to obtain a feature vector;
acquiring a first hidden layer in the encoder and calculating the feature vector through the acquired first hidden layer to obtain the target vector.

17. The non-transitory storage medium of claim 15, wherein comparing the target image with the product image to obtain a target error comprises:
acquiring all pixels of the product image as a plurality of examinable pixels, and acquiring all pixels of the target image as a plurality of target pixels;

comparing each target pixel with the corresponding examinable pixel and when a comparison result is that a target pixel is different from the corresponding examinable pixel;

calculating a number of differences between the target pixel as being a first number and the corresponding examinable pixel;

calculating a total number of the plurality of target pixels as being a second number;

dividing the first number by the second number to obtain the target error.

18. The non-transitory storage medium of claim 15, wherein inputting the target vector into a Gaussian mixture model to obtain a test probability of the product image and inputting the plurality of latent vectors into the Gaussian mixture model to obtain an estimated probability of each corresponding positive sample image comprises:

inputting the plurality of latent vectors into the Gaussian mixture model to obtain a feature distribution of the plurality of positive sample images;

determining an average value and a covariance of the plurality of latent vectors according to the feature distribution;

acquiring a mixing coefficient of the Gaussian mixture model;

determining a test probability of the product image according to the target vector, the average value, the covariance and the mixing coefficient;

determining the test probability of each positive sample image according to each latent vector, the average value, and the covariance and the mixing coefficient.

19. The non-transitory storage medium of claim 15, wherein determining a sample error of each positive sample image according to the corresponding reconstruction error and the corresponding estimated probability comprises:

calculating a logarithmic value of each estimated probability;

calculating a weighted sum of an opposite value of the logarithmic value and the corresponding reconstruction error to obtain the sample error of the corresponding positive sample image.

20. The non-transitory storage medium of claim 15, wherein selecting an error threshold from a plurality of the sample errors comprises:

sorting the sample errors in ascending order to obtain a list of errors and a sequence number of each sample error in the list of errors;

calculating a number of the sample errors as being a third number;

multiplying the third number by a configuration value to obtain a target value;

selecting a sample error which has sequence number equal to the target value from the error list and determining the sequence number of the selected sample error as the error threshold.

\* \* \* \* \*